No. 891,450. PATENTED JUNE 23, 1908.
A. G. WEANDER.
SEED TESTER CUP.
APPLICATION FILED FEB. 11, 1908.
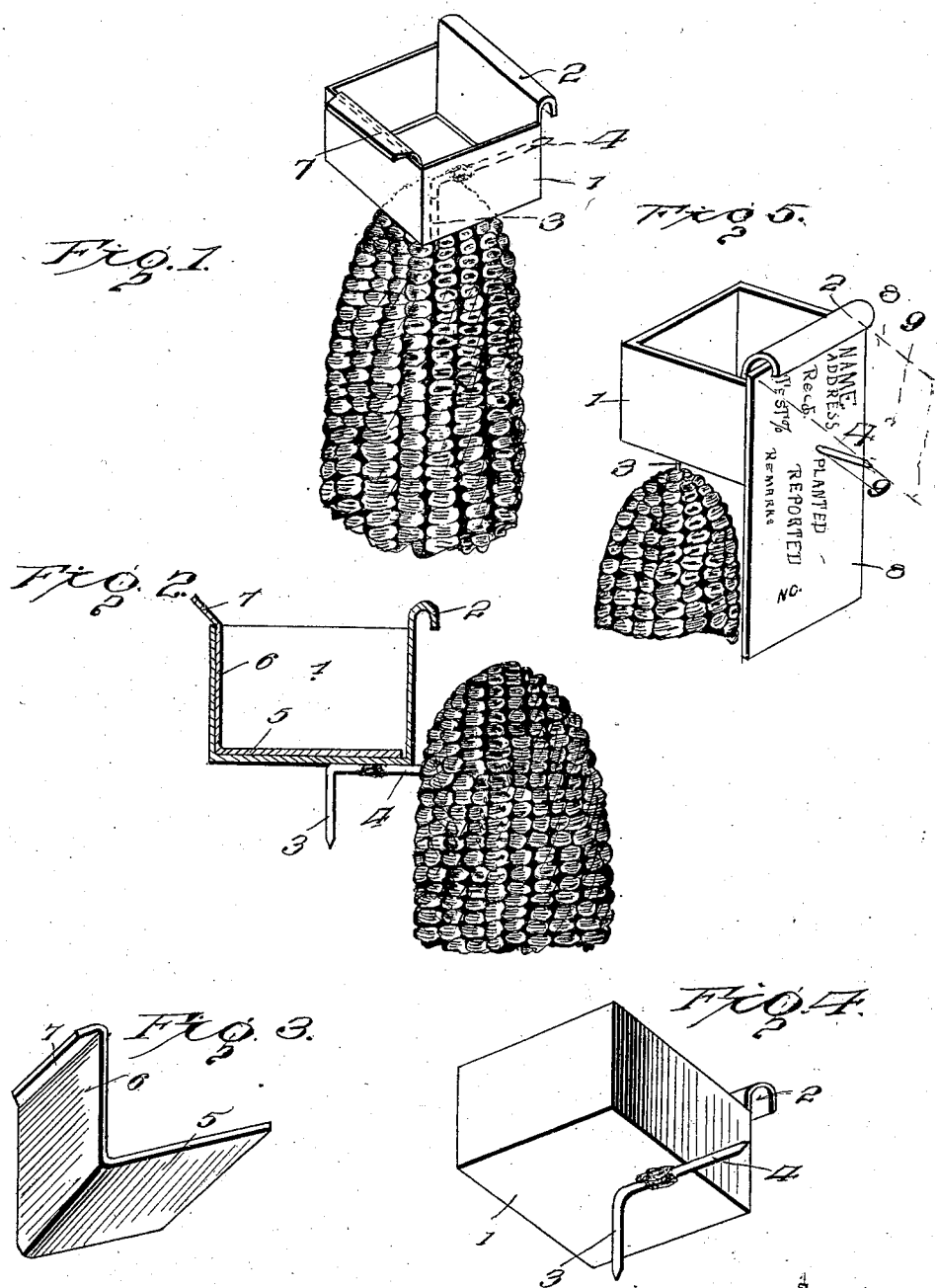

UNITED STATES PATENT OFFICE.

ANDREW G. WEANDER, OF SIOUX CITY, IOWA.

SEED-TESTER CUP.

No. 891,450.    Specification of Letters Patent.    Patented June 23, 1908.

Application filed February 11, 1908. Serial No. 415,386.

*To all whom it may concern:*

Be it known that I, ANDREW G. WEANDER, citizen of the United States, residing at Sioux City, in the county of Woodbury and State of Iowa, have invented certain new and useful Improvements in Seed-Tester Cups, of which the following is a specification.

The present invention relates to seed testing appliances, and more particularly to an improved tester cup embodying a novel construction whereby the same can be readily attached to a support an ear of corn, or like object and held in proper position.

The invention further contemplates an improved transplanting attachment designed to be employed in connection with a cup, to enable a plant to be lifted therefrom without disturbing the roots thereof.

For a full description of the invention and the merits thereof reference is to be had to the following description and accompanying drawings, in which:

Figure 1 is a perspective view showing the seed tester cup applied to one end of an ear of corn. Fig. 2 is a vertical sectional view showing the tester cup applied to the side of an ear of corn. Fig. 3 is a detail view of the transplanting attachment. Fig. 4 is a perspective view of the tester cup showing the bottom thereof. Fig. 5 is a detail view showing a record card applied to one of the cups.

Corresponding and like parts are referred to in the following description and indicated in all the views of the drawings by the same reference characters.

Specifically describing the present embodiment of the invention the numeral 1 designates the cup, which is designed to receive the soil within which the seed to be tested may be planted and permitted to germinate. This tester cup may be of any approved form, although in the present instance it is shown as rectangular in shape and is formed from a single piece of sheet material. A hook member 2 projects from the upper edge of the cup 1 upon one side thereof, and is designed to engage a rope or cable under certain conditions as will be more fully set forth. In the preferred construction this member 2 is formed, as shown on the drawing, by extending one of the sides of the cup upwardly and returning the same.

Projecting downwardly from the bottom of the tester cup is a prong 3, and in a similar manner, a second prong 4 projects laterally from the cup, the two prongs being shown in the present instance as formed from a single piece of wire soldered or otherwise rigidly secured to the bottom of the cup and having the extremities thereof sharpened and disposed at right angles to each other. When the device is utilized for testing corn, and it is desired to suspend the corn from a cable, the downwardly projecting prong 3 may be embedded in one end of the ear of corn, and the hook member 2 caused to engage the cable. However, instead of utilizing the downwardly extending prong 3, it may under certain conditions be found desirable to employ the laterally extending prong 4, in which instance, the said prong 4 is embedded in one side of the ear of corn. It also frequently happens that instead of suspending the corn from a cable, the ears are laid in rows upon shelving, and in this instance, the downwardly extending prong 3 may be embedded in one side of the ear of corn, and the tester cup thereby supported in position.

The invention further contemplates a novel attachment for lifting the plants from the cup when removing the same to the beds or garden. This transplanting attachment comprises a lifting plate 5, designed to rest upon the bottom of the cup and corresponding in shape to the same. Projecting upwardly from one side of the lifting plate is an arm 6 which extends above the mouth of the tester cup where it terminates in a finger piece 7. In the present instance, this finger piece is formed by deflecting the upper edge of the arm 6 laterally. It will be thus apparent that by grasping the said finger piece and pulling upwardly thereon, the lifting plate 5 will be elevated, and the contents of the cup removed in such manner as not to interfere with the roots of the plant.

For the purpose of keeping a record of the seed being tested, a card 8 having spaces thereon, as clearly indicated on the drawing, to receive the necessary data, is utilized in connection with the cups. These cards 8 are perforated at 9, and when applied to the cup, one edge of the card is received within the hooked portion 2, while the lateral prong 4 projects through the opening 9. In this manner the card is held against accidental displacement, but can be readily applied to the tester cup, or removed therefrom as desired.

Having thus described the invention, what is claimed as new is:

1. A seed tester cup provided with a downwardly projecting prong and also with a laterally projecting prong.

2. A seed tester cup provided with a downwardly projecting prong and also with a laterally projecting prong, the said prongs being formed from a single length of material rigidly secured to the cup and having the end portions thereof bent at angles to each other.

3. A seed tester cup provided with a prong projecting downwardly from the bottom thereof, and also provided with a second prong projecting laterally from the bottom thereof.

4. The combination of a seed tester cup, means upon the cup for engaging a support, and a record card adapted to have an interlocking connection with the said support engaging means.

5. The combination of a seed tester cup, means upon the cup for suspending the same, a prong projecting from the cup, and a record card held in position upon the cup by the prong and suspending means.

6. The combination of a seed tester cup formed with a hooked portion, and a prong, and a perforated record card, one of the edges of the card being designed to engage the hooked portion of the cup, while the perforation therein is designed to receive the prong projecting from the cup.

In testimony whereof I affix my signature in presence of two witnesses.

ANDREW G. WEANDER. [L. S.]

Witnesses:
   MATILDA JULCH,
   C. B. HIGMAN.